Nov. 11, 1969 B. C. MALONE 3,477,506
APPARATUS RELATING TO FABRICATION AND INSTALLATION
OF EXPANDED MEMBERS
Original Filed Oct. 22, 1965 3 Sheets-Sheet 1
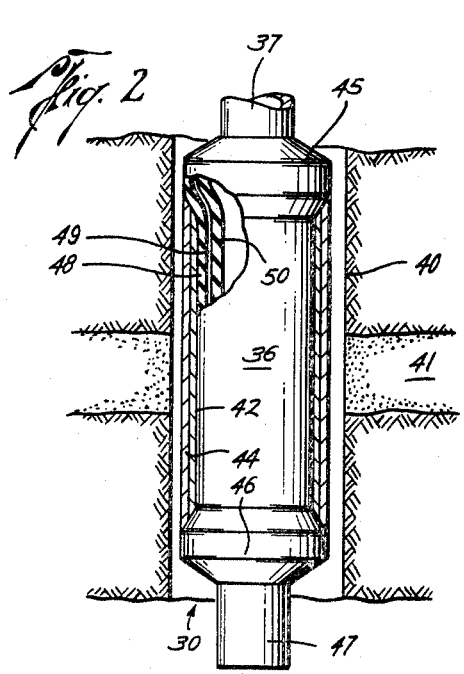
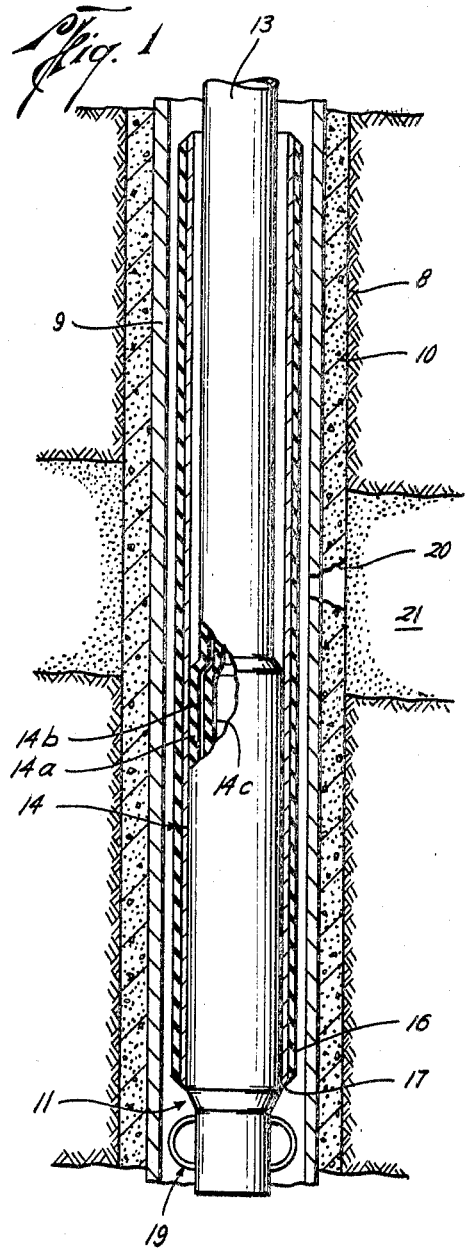
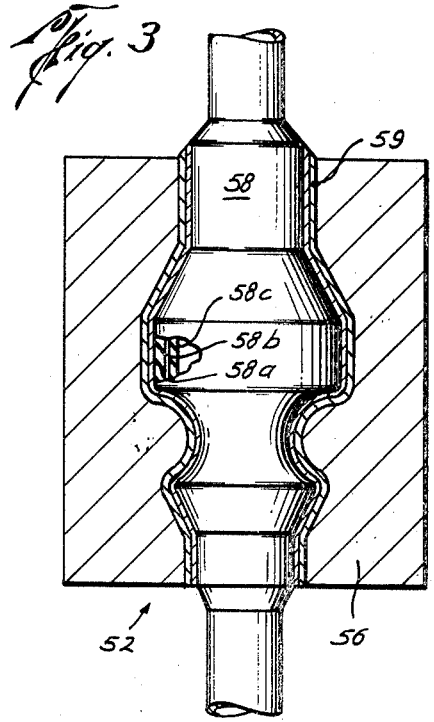
Billy C. Malone
INVENTOR.
BY Hayden & Pravel
ATTORNEYS

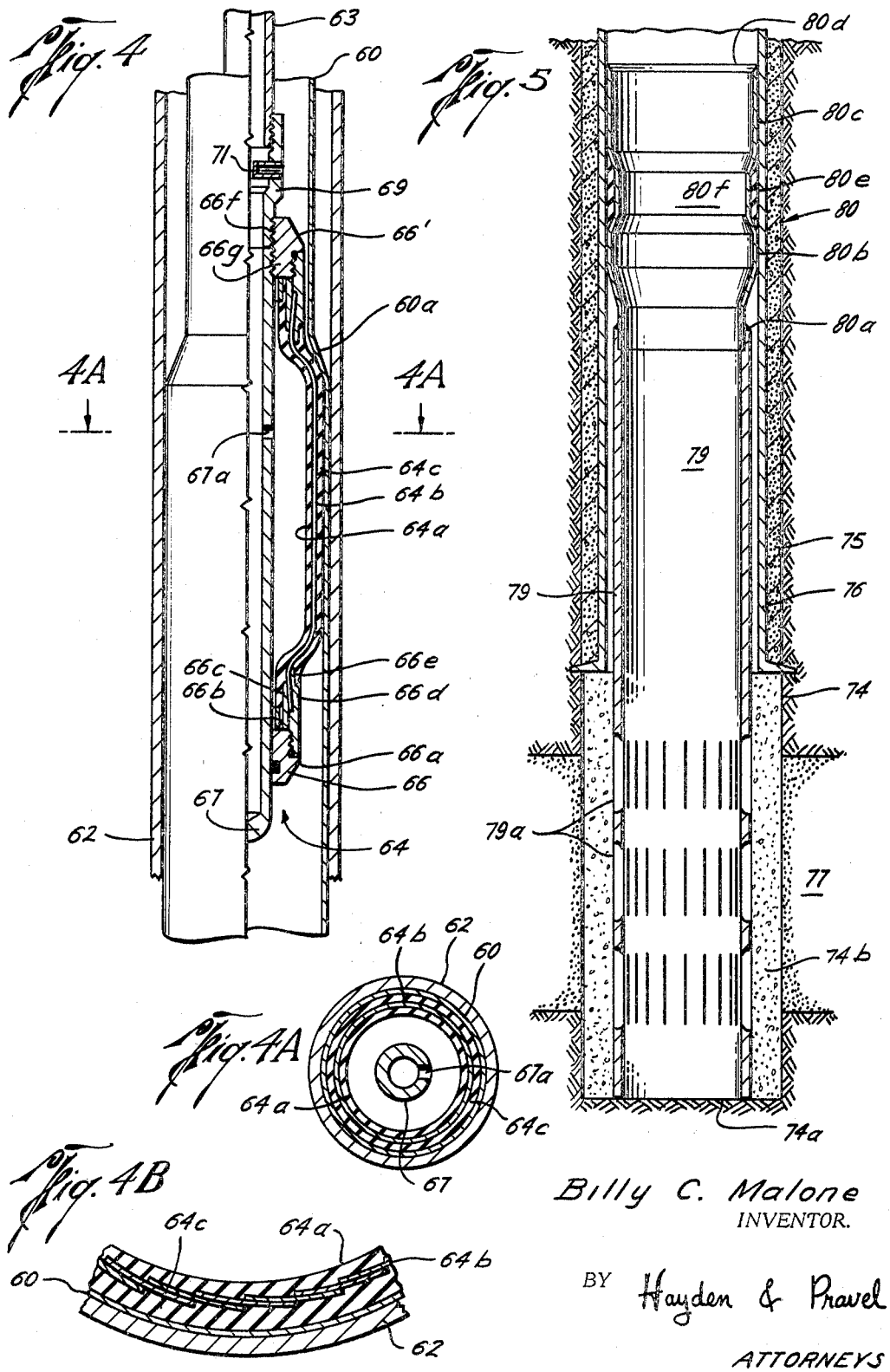

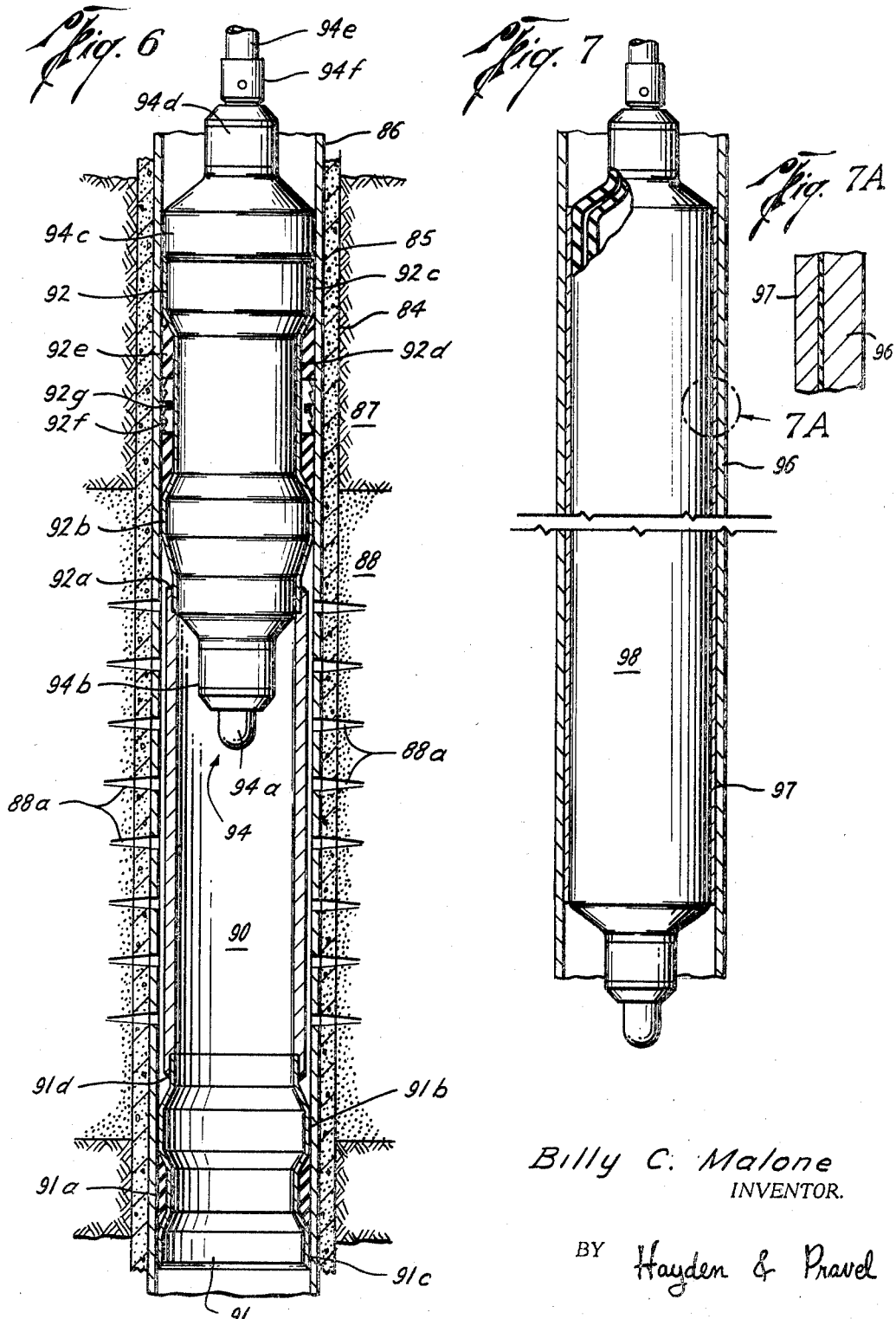

United States Patent Office 3,477,506
Patented Nov. 11, 1969

3,477,506
APPARATUS RELATING TO FABRICATION AND
INSTALLATION OF EXPANDED MEMBERS
Billy C. Malone, Houston, Tex., assignor to Lynes, Inc.,
a corporation of Texas
Continuation of application Ser. No. 501,599, Oct. 22,
1965. This application July 22, 1968, Ser. No. 752,444
Int. Cl. E21b 43/10, 29/00, 23/04
U.S. Cl. 166—207                                5 Claims

ABSTRACT OF THE DISCLOSURE

A method and apparatus useful in and adaptable for fabrication in situ of expanded members to patch or repair pipe, to position, install and seal various tubular members in well bores, cased holes or the like, and to expand members to a conforming configuration within a surrounding structure such as a mold, hole, pipe or the like.

---

This application is a continuation of application Ser. No. 501,599, filed Oct. 22, 1965, now abandoned.

Description of the prior art

The installation of liners or other members has been attempted in well bores, whether cased or uncased, in environments of high pressures, or temperatures, or corrosive conditions, or the combination of all, or several of these conditions. As can be recognized, these conditions occurring in wells have made it extremely difficult to provide a tubular liner for well bores which maintains an effective seal under the conditions encountered therein over an extended period. Furthermore, the positioning and setting of liners within a well bore, or any other "blind" opening presents other difficulties.

Summary of the invention

In view of the foregoing, it should be recognized that the practicalities of expanding and placing tubular liners in bore holes requires expansion of materials ranging from plastics to high strength steels having a very high yield strength. The pressure required to expand a tubular member, formed of steel for instance, increases with the thickness of the member so that it will be recognized that extremely high pressures are required to place a structurally adequate seal member in a well bore or pipe and to also obtain proper seating and sealing thereof.

The proper completion of oil wells is sometimes dependent on placing a liner in the well bore with the liner sealed against the well bore wall to aid in controlling the flow of petroleum liquids from a formation into the well bore. For example, it may be desirable to selectively seal off one or more formations from communication with the production string such as sealing off a water producing formation, or to control the amount of gas flowing from a gas bearing formation in relation to the amount of oil flowing from an oil bearing formation.

Without excessive elaboration, it can be appreciated that there are other uses for the present invention in well bores.

Also, the present invention provides a means and a method relating to expansion of heavy gauge materials having a high yield strength within molds, or other surrounding structures such as pipes and the like.

One object of this invention is to provide a new and improved device which positions and sets a tubular member in a well bore to cover perforations, patch split casing, repair corroded pipe, or to generally effect other repairs and installations therein.

An object of the present invention is to provide a method for expanding tubular members in openings when the tubular member is fabricated of material having a high yield strength wherein expansion work hardens the member and provides a completed device of substantial structural strength after expansion.

Another object of the present invention is to provide a tubular liner for a well bore which incorporates a sleeve with seal members on the sleeve for positioning and seating the sleeve in the well bore and maintaining a seal therewith indefinitely.

One object of the present invention is to provide an apparatus which may be run into openings, holes, or other passages for expanding tubular liners, which device includes a reinforcing sheath for containing high internal pressures required to deform and set liners made of materials of high yield strength.

Still another object of the present invention is to provide an expansible device capable of stressing tubular members in well bores or pipes having yield strengths as high as or higher than that of stainless steel.

Another object of the present invention is to provide a device which sets a patch in a pipe, casing, or open hole.

An important object of the present invention is to provide a new and improved device for setting a tubular member in well bores or openings including one or more anchor members which are expandable to engage and seal against the surrounding wall structure for setting the tubular member therein.

Still a further object of the present invention is to provide a new and improved device which carries a tubular member of material having a high yield strength into a well bore and expands same by inflating a segmented reinforcing jacket.

A further object of the present invention is to provide a new and improved device for installing a tubular member of any length having a sealing material on the exterior thereof whereby repair of a given length of pipe of casing can be accomplished.

One object of the present invention is to provide a new and improved device for expanding tubular members wherein excessively large forces are required to accomplish yield stresses in the tubular member and which forces are provided by expansion of a reinforcing sheath overlaid on an inflatable member.

An additional object of the present invention is to provide a tool for setting an elongated tubular member in a well bore by expanding the tool adjacent selected portions of the tubular member until the desired length of the tuular member is expanded and set.

One object of the present invention is to provide a new and improved device for running a tubular member to be expanded into a well bore or other opening which includes means therewith protecting the lower open end of the member to be expanded.

Other objects and advantages of the present invention will become more readily apparent from the following drawings wherein:

FIG. 1 is a longitudinal sectional view illustrating a liner of the present invention being lowered into a well bore on a tool which may be used for expanding the liner to a seated position in the well bore for sealing an opening or a split in the casing;

FIG. 2 illustrates the present invention in an uncased well bore for setting a liner in an open hole;

FIG. 3 is a longitudinal sectional view illustrating the expandable device of the present invention for conforming a tubular member to the internal configuration of a mold;

FIG. 4 is a longitudinal, partly sectional view, illustrating the present invention expanded within a well string for seating and sealing a liner of greater length than the inflatable device;

FIG. 4A is a sectional view taken along the line 4A—4A of FIG. 4 which illustrates construction of the inflatable device and the liner shown in FIG. 4;

FIG. 4B is an enlarged view of a portion of the inflatable device expanded against the liner and surrounding well string which illustrates details of the reinforcing sheath and one manner of expanding same;

FIG. 5 is a vertical sectional view of a slotted liner having a seal at its upper end for anchoring the liner in a well bore and for positioning the liner with its slots adjacent a producing formation;

FIG. 6 is a sectional view of a liner positioned in a well bore and secured in place by seal members at its upper and lower ends which anchor the liner in the well bore to seal off a perforated section in the well bore;

FIG. 7 is a sectional view of the liner positioned within a pipe; and

FIG. 7A is a partial sectional view drawn to an enlarged scale illustrating the relationship of the liner, sealing material on the exterior of said liner, and the pipe within which the liner is expanded.

In FIG. 1 of the drawings, a well bore is indicated at 8 and is shown as having a casing 9 therein which is cemented in place by means of the cement represented at 10. The present invention may be employed in either a cased or uncased hole, and when used in a cased hole such as shown in FIG. 1, it can be employed in a variety of situations. For example, it may be employed to seal off a hole or leak in the casing; it may be employed to reinforce a portion of the casing; it may be employed as an extension on the casing; or it may be employed in other situations.

One form of the apparatus of the present invention is indicated generally by the numeral 11 and is shown as having an outer covering or coating 16. In some instances, the outer coating 16 may be eliminated depending on the particular use of the invention, and additional description will hereinafter relate use of the present invention without an outer coating. As shown in FIG. 1 of the drawings, the outer coating 16 is preferably a resilient coating and is represented as extending substantially the full length of the invention 11. The coating 16 serves as a sealing material and it can be rubber, other elastomers, plastic or materials which react on passage of time (perhaps even at elevated temperatures and pressures) to set up and provide a seal as will be described hereinafter. The coating material 16 is placed on a tubular member 17 which is of suitable thickness and fabricated of a high yield strength material adapted to be expanded in situ and work hardened into a liner, sleeve, or the like.

The elongated tubular member or liner 17 is formed of the material which has high yield strength as described above and which is substantially inert to the liquids and gases flowing in the well bore, even at the elevated pressures and temperatures normally found in well bores. Also, the material preferably has a substantially large range between its yield strength point and rupture point so that it is pliable or expandable between these two points. Internal prestressing on expansion increases the strength of the member 17 to withstand the external pressure acting thereon which tends to collapse it and also to withstand the internal pressure within the well bore which tends to burst or rupture the member 17.

The length of the tubular member in liner 17 may range from a few inches to many feet. While the thickness may vary, it should be of a suitable thickness to provide an adequate prestressed structure on expansion by an inflatable element as will be described in greater detail hereinafter. As a practical matter, it has been found that stainless steel of $\frac{1}{8}''$ thickness functions satisfactorily for the member 17 in well bores such as the well bore 8.

The liner 17 is illustrated in FIG. 1 as being lowered into the well bore 8 on a well string 13. Connected in the well string 13 is an inflatable element indicated generally at 14 which is shown partially expanded to retain or hold the tubular member 17 in position thereon as the member 17 and inflatable element 14 are lowered into the well bore 8 on the well string 13. A suitable form of the inflatable member 14 for use with the embodiment shown in FIG. 1 will be described hereinafter in reference to FIG. 4. However, it is worthy of mention at this juncture that the inflatable element 14 includes an outer resilient member 14a shown in the portion of the member broken away in FIG. 1; a segmented, reinforcing sheath for withstanding internal stresses of the inflatable member 14 is indicated at 14b; and an internal inflatable member 14c is positioned interiorly of the reinforcing sheath for receiving fluid for inflation of the inflatable device 14.

The inflatable element 14 is in the general configuration of a mandrel which extends through the elongate, deformable tubular member 17. The member 17 has an open lower end shown in FIG. 1 positioned above a protector means indicated generally at 19. The protector means 19 is carried below the inflatable element 14 and extends outwardly circumferentially below the lower open end of the member 17 to prevent damage to the member 17 when running the apparatus 11 of this invention into the well bore 8. The protector means 19 has a greater diameter than the member 17 when the member 17 is unexpanded as shown in FIG. 1, but the means 19 has a smaller diameter than the member 17 after expansion to permit retrieval of the inflatable element 14 and the protector means 19 therethrough when the member 17 is installed in the well bore 8.

One of the novel features of the present invention 11 is the manner of lowering, expanding, and sealing the liner 17 in the well bore. The inflatable element is initially partially expanded so that the member 17 is firmly grasped or engaged thereby whereupon the well string 13 is then lowered into the well bore 8 by means well known in the art. When the liner 17 is positioned at the proper or desired level in the well bore, pressure fluid is conducted through the well string 13 to the inflatable element 14 to expand it. Expansion of the member 14 forces the member 17 to stress past the elastic limit and into the plastic range whereupon the member 17 is permanently set by full expansion of the inflatable member 14 to circumferentially contact the wall of the casing 9 in the well bore 8. The present invention utilizes a further increase in pressure in the inflatable element 14 to force or extrude the resilient material of the outer covering or coating 16 into voids, crevices, and other irregularities in the casing 9 in the well bore to fixedly seal and seat the liner 17 in position. Also, the expansion of the liner 17 beyond the yield strength of the material from which it is formed creates internal stresses within the liner which strengthen it against external collapsing pressures and internal bursting pressures.

After the liner 17 has been positioned by expansion and deformation as described above, the element 14 is deflated whereupon it may be easily recovered from the expanded portion of the member 17. If the member 17 should be coextensive with the inflatable element 14 or even shorter, the well string 13 and the inflatable element 14 may be retrieved from the well bore 8 immediately. However, as shown in FIG. 1, the member 17 is coterminous only with the lower end of the inflatable element 14. Should it be desirable to expand the full length of the member 17, the method of the present invention provides that the inflatable element 14 may be expanded a second time adjacent an unexpanded portion of the tubular member 17 as described above, then deflated and thereafter retrieved. Before retrieval, however, the element 14 is moved on the well string 13 to a new position adjacent to and coextensive with another portion of the member 17 for expansion to conformity with the casing 9 provided in the well bore 8. Without excessive elaboration, it should be sufficient to those skilled in the art to understand that stepwise expansion of the inflatable element 14 along the full length of the member 17 is achieved by repeating the above described steps of inflation, expansion, deflation, and retraction. If desirable, expansion of the tubular member or liner 17 can be done stepwise in sequential order beginning with the bottom portion immediately adjacent to the inflatable element 14 shown in FIG. 1, or the expansion may be accomplished in other than sequential order of the member 17.

As a practical matter, the method of this invention may be practiced by visual observation of the gauge on the well pipe 13 at the top of the well bore 8. For example, the pressure in well pipe 13 and inflatable element 14 as indicated by the gauge at the earth's surface will remain substantially the same during expansion of the liner 17; but the volume of liquid pumped into the inflatable element 14 will increase. When the liner 17 engages the wall of the casing or well bore, the pressure in the inflatable element 14 will increase with continued pumping to element 14 to force the resilient coating material 16 to flow or extrude into surface voids and irregularities contacted thereagainst. Thereafter, the pressure in the inflatable element 14 is reduced to enable it to be withdrawn or repositioned for subsequent expansion adjacent another portion of the liner 17.

Consider, for example, a crack or fissure 20 extending through the casing 9 and the cement 10 and opening into the formation 21 whereby well fluids escape from the interior of the casing 9 and into the formation 21. The formation 21 might be a fresh water producing sand, or some other formation having a lower internal pressure than the pressure within the casing 9. Well fluids in the casing 9 driven by the pressure differential can pollute the fresh water, which result is usually undesirable. On the other hand, the hydrostatic pressure in the formation 21 may exceed the pressure within the casing 9 and might force salt water or other nonpetroleum fluids into casing 9 and enter the flow of liquids up the casing 9 and thereby increase the expense of extracting the petroleum products from the commingled fluids.

In order to seal off the crack or opening 20 extending through the casing and cement, the liner 17 is lowered into the well on the partially inflated element 14 suspended from the drill string 13 and is positioned opposite the crack or opening 20 as illustrated in FIG. 1 of the drawings. When the aparatus 11 is in this position, fluid pressure developed in the well string 13 inflates the inflatable element 14 whereupon the liner 17 formed of high strength material as noted hereinabove is expended to contact the interior of the casing 9. The rubber covering 16 on the liner 17 engages the inner surface of the casing 9 as the pressure in the element 14 is increased to fill the surface irregularities in the casing 9 with the resilient, extrudable material 16 formed on the exterior of the present invention 11.

In the use and installation of shorter liners similar to the liner 17 shown in FIG. 1, it may be desirable to provide an inflatable element 14 which is of the same extent or of greater longitudinal extent than the liner 17 so that inflation of the element 14 will simultaneously expand the full length of the liner 17 into the sealing position in the casing 9 of the well bore 8 as shown in FIG. 1.

In FIG. 2, the present invention is shown in an embodiment 30 wherein an inflatable member 36 is suspended on a well string 37 in an open hole 40; and there is indicated a geological formation 41 penetrated by the open well bore 40. The open hole 40 is shown as being uncased and without cement to illustrate the use of the present invention in open hole. As understood by those knowledgeable with the art of drilling oil wells, the extent of irregularity of the bore hole 40 may vary from the representation of the hole 40 in FIG. 2; however, the present invention 30 is adapted to be placed on the well string 37 and positioned adjacent the geological formation 41 for sealing same to prevent communication with the bore hole 40. It may be desirable to seal the formation 41 to prevent pollution of the formation 41 or, conversely, to prevent leakage of polluting liquids, gases, or the flow of sand therefrom into the well bore 40. In any event, the present embodiment 30 provides on the exterior of the inflatable element 36 a deformable, preferably tubular, member of an adequate wall thickness and having a coating of resilient material 44 thereon. The tubular member 42 formed of a high yield strength material which is, similar to the tubular member 17 shown in FIG. 1, preferably inert to substances flowing in the well bore.

The apparatus 30 illustrated in FIG. 2 of the drawings is used for expanding a tubular member 42 of high yield strength with exceedingly high internal pressures in the inflatable element 36. The inflatable element 36 is provided with a pair of upper and lower heads 45 and 46, respectively, formed on a mandrel 47 and having extending therebetween an outer resilient member 48, a sheath 49 comprising a plurality of segmented, overlapping members preferably made of woven wire or the like, and an inner liner 50 which is adapted to receive and contain pressure fluid for the inflation of the inflatable device 36. The fluid is received within the inflatable member 50 and expands the segmented, reinforcing sheath 49 which carries the internal stresses of the inflatable member 36 while expanding the external member 48 against the tubular liner 42.

In operation, the embodiment 30 shown in FIG. 2 is preferably utilized by running the well string 37 into the bore hole 40 to position the inflatable device 36 and tubular liner 42 thereon adjacent to the formation 41. Pressure fluid is conducted in the previously described manner through the well string 37 to the inflatable device 36 to achieve expansion of the tubular member 42 and the resilient material 44 about the tubular member 42. The tubular member 42 is stressed beyond yield strength and is work hardened to maintain the diameter of the uncased hole 40 on collapse of the inflatable element 36 and removal thereof. The resilient material 44 is conformed against the rough contours and surfaces of the well bore 40 and is thereby extruded into various cracks, crevices and other openings sufficiently to seal the well bore 40 against communication with the strata 41. Since the tubular member 42 is shown as being coterminous with the inflatable element 36, it is only required to once inflate the element 36 by pressure fluid delivered through the well string 37, which thereafter permits deflation and retrieval of the inflatable element 36 from the well bore 40, leaving the tubular member 42 fully deformed beyond yield strength and work hardened, and in position to serve as a liner within the well bore 40.

FIG. 3 illustrates the use of the present invention which is indicated generally at 52 as a means for fabricating a deformable member to a desired shape within a mold 56. Inflatable element 58 is provided with a tubular member 59 which is registered with the mold 56 prior to inflation of the inflatable element 58. The element 58 is inflated by pressure fluid provided to the inflatable element 58 and expansion takes place within the mold 56 and stresses the deformable member 59 beyond its yield strength whereupon the member 59 is conformed to the internal configuration of the mold 56. The mold 57 is of multipiece construction and has a plurality of segments or parts for ease of removal of the member 59 after deformation to the contour of the mold 56. For instance, the mold 56 might include two portions fitted about the inflatable element 58 and the tubular member 59. Alternatively, other segmental arrangement may be utilized.

The inflatable element 58 is similar to the previously described inflatable elements shown in FIGS. 1 and 2, and preferably includes an elastic member 58a surrounding a segmented, reinforcing sheath 58b which envelops a resilient, internal member 58c for receiving pressure fluid for inflating same. It is contemplated that the tubular member 59 not include resilient material on its exterior because customary use of the apparatus 52 within the mold 56 envisions removal of the member 59 after deformation to its desired shape.

Attention is next directed to the FIG. 4 of the drawings which illustrates in sectional view a tubular liner 60 positioned within a pipe 62 or other hollow device for expansion by an inflatable device indicated generally at 64. The inflatable device 64 is secured to a pressure conduit 63 for receiving pressure fluid for expansion of the tubular member 60 beyond its yield strength as indicated at the deformed portion 60a. The inflatable device 64 includes, in the main, an inner resilient sheath or liner 64a which is surrounted by a reinforcing sheath 64b made of overlapping metal strip or other suitable reinforcing material which is covered by an outer sheath 64c. Each of the three above mentioned layers resembles a sleeve extending longitudinally of the inflatable device 64 and each is engaged at its upper and lower ends by a pair of similar heads 66' and 66 with the head 66' at the upper end of the tool and having inlet means 67a for the pressure fluid in conduit 63. The resilient sheaths 64a and 64c are formed of a yieldable material such as rubber, and they may be generally described as enclosing the reinforcing sheath 64b which includes the overlapping metal strips or members as will be described in greater detail hereinafter.

Attention is directed to the lower head 66 which is positioned on and which encircles a centrally located support tubing member 67. The lower head 66 includes a bushing 66a which is sealed to the support tubing 67. The encircling bushing 66a is abutted by a tubular sleeve 66b which is arranged coaxially and interiorly of the inner resilient sheath 64a as a means of holding same in position. A wedge 66c (of circular construction) is placed about the lower end of the inner sheath 64a and co-operates with the tubular sleeve 66b to circumferentially grasp or pinch the lower end of the resilient member 64 to hold it in position. An inwardly flared and concentrically extended skirt member 66d is located radially outwardly of the wedge 66c, but it also includes a forward edge or lip 66e which extends beyond the wedge 66c and slightly radially inwardly theretowards to co-operate therewith as a means for grasping and engaging the lower ends of the individual segments comprising the reinforcing sheath 64b whereby the head 66 anchors the reinforcing segment ends and also prevents circumferential separation of the segments of the reinforcing sheath 64b. The encircling skirt 66d is of reduced diameter near the outer lip 66e for receiving the end of the outer resilient sheath 64c on the reduced diameter lip.

The upper head 66' is similar to the lower head in that it includes a sleeve 66b, the wedge 66c which is of encircling construction, and the skirt member 66d. A bushing 66g is threaded to the support tubing 67 by threads 66f, which bushing is also connected to the nipple 69. The nipple 69 is engaged at the threads 66f with the bushing 66g which serves to join the inflatable device 64 to the well string 63.

A frangible port arrangement 71 is provided in the nipple 69 so that a sinker bar or drop bar or other means may be lowered through the well string 63 to break 71 and thereby enables the pressure in the well string 63 and well bore to equalize.

FIG. 4A, a sectional view of the inflatable device 64, illustrates the concentric sleeve-shaped members of the inflatable device 64 in expanded condition. A radially extended opening 67a in the support tubing 67 conducts pressure fluid supplied by the conduit 63 into the inflatable device 64 to expand the inner sheath 64a. Of course, the support tubing 67 may include more than one opening of any desired diameter.

FIG. 4B illustrates details of the reinforcing sheath 64b and the inner and outer expansible members 64a and 64c, respectively. The resilient sheath 64a is inflated by pressure fluid received therein but transmits the force of expansion to the reinforcing sheath 64b. The plurality of the flexible metal strips overlaps sufficiently in the deflated state to maintain the illustrated overlap shown in FIG. 4B even on full inflation. Extent of the overlap of the segments in the deflated state is subject to variation depending on the extent of the desired inflation and other factors. The segmented, reinforcing sheath 64b is constructed and arranged to withstand internal pressure of the inflatable device 64 while yet providing an inflatable device having a wide range of expansion without leaking or permanently distorting. By way of example and not limitation, each of the segments in the reinforcing sheath 64b is preferably formed of a plurality of wires which are woven together to fabricate one of the segments. Segments are secured to the heads 66 and 66' with the indicated overlapping arrangement and are preferably arranged parallel to one another with the same extent of overlapping relationship one to another fully about the circumference of the inflatable element 64.

Reference is made to FIG. 5 of the present invention which illustrates in sectional view a well bore and one particularly advantageous use of the present invention. In FIG. 5 the well bore indicated at 74 is cemented by the cementitious material 75 surrounding the well string 76. The well bore 74 extends through a producing formation 77 and terminates therebelow at the bottom 74a. Petroleum products are sometimes taken from a producing formation by filtering the products through a layer of loose material such as gravel 74b or similar substances placed on the bottom 74a of the bore hole and in communication with the producing formation 77 to provide openings to the flow of fluids from the formation. The liner of this invention is indicated at 79 and includes a plurality of slots 79a of adequate size, length and number to permit the flow of petroleum fluids from the formation 77 through the gravel 74b and into the openings 79a into the liner 79.

The liner 79 includes means indicated generally at 80 at its upper end for anchoring and sealing the liner 79 within the well bore 74. The seal member, shown after expansion, is joined to the liner 79 by welding at 80a or other acceptable means. The anchor member 80 is expanded to circumferentially contact the well string 76 at the lands indicated at 80b and 80c. The open upper end 80d of the anchor member permits the flow of well fluids in the well string 76 for recovery by well known means. The lands 80b and 80c cooperate with sealing resilient member 80e between the lands 80b and 80c, which member 80e is made of resilient material such as rubber or the like. Of course, a portion 80f of the anchor member has a reduced diameter to accommodate the resilient material on the exterior of the anchor member 80 after expansion.

Reference is made to the description preceding heretofore and relating to other embodiments of the present invention for an understanding of the means and methods by which the seal member 80 is conformed to the wall of the well string 76 for anchoring the slotted liner 79 in the well bore 74 and for also providing a sealed connection therebetween.

Again, the member 80 shown in FIG. 5 is preferably formed of a desired thickness of high yield strength material.

FIG. 6 illustrates in sectional view a well bore 84 which is cemented along its full length by the material 85 which is placed exteriorly of a well string 86. The earth's subsurface is indicated generally at 87, and it will be noticed that the well bore 84 extends through a formation 88 and infinitely therebeyond, it being assumed that the formation 88 is a formation producing petroleum products. Because of many various reasons not here important, it may be expeditious to extend the well bore 84 through the producing formation 88 which, by way of comparison with the production arrangement illustrated in FIG. 5, creates difficulty in setting a slotted liner because the bottom is too far removed from the formation 88 to be of assistance.

A variety of production techniques is available for securing petroleum fluids from the formation 88 and one such means is illustrated in FIG. 6 in the form of a plurality of perforations 88a formed by detonation of shaped charges which puncture the well pipe, cement and formation in the illustrated manner. Pressure in the formation 88 drives petroleum fluids through the perforations 88a into the well bore and the fluids are thereafter produced. The liner shown in FIG. 6 is a solid liner and is, in fact, intended to seal off the formation 88 from access to the well string 86. The reasons are possibly manifold, but one reason may be the fact that the producing sand 88 is depleted while the well bore 84 extends therebelow and into another sand which can be produced separately at a later time. The liner 90 shown in FIG. 6 includes a seal member 91 at its lower end and a slightly different seal member 92 shown at its upper end.

The seal member 91 is similar to the seal member 80 shown in FIG. 5 and includes an encircling strip of resilient material 91a which is squeezed on expansion of the seal member to contact and frictionally grip the well pipe 86. The material 91a is encompassed by portions 91b and 91c which are expanded against the well pipe 86 for securing the lower seal 91 in place and leakage past the seal 91 is prevented by the extrusion of the material 91a into intimate contact with the pipe. The seal 91 is joined to the liner 90 by means such as welding, such means being indicated at 91d.

The upper seal member 92 is somewhat greater in length than lower seal member 91. It, too, is joined with the liner 90 at a weld at 92a in the preferred embodiment and includes the indicated expanded portions 92b and 92c. Between the expanded portions which are contacted against the well string 86 is a slightly reduced neck 92d which is surrounded by resilient material 92e which includes a centrally positioned set of slips 92f. The segmented slips 92f have downwardly pointing serrations which engage the well pipe 86 in a manner well known in the art for supporting the weight of the liner 90. It may be appreciated that the slips 92f are sufficient to support the weight of the sleeve 90 suspended in the well bore for an indefinite period of time so that the installation of FIG. 6 is permanent. The slips 92f are placed on the seal member 92 before it is expanded wherein the plurality of slip segments comprising the slips are secured about the seal member 92 by means of a small coil spring 92g. The spring 92g is placed in a groove in the segments prior to expansion in the well bore casing 86.

It may be appreciated that the seal member 92 may be duplicated at the lower end of the liner 90 in lieu of the seal member 91 as illustrated in the preferred embodiment. Likewise, it may be found unnecessary to utilize slips to support the weight of the liner so that the lower seal member may be used at the upper end of the sleeve 90.

An inflatable device is indicated generally at 94 for expanding the sealing member 92 within the well string 86. The device is preferably similar to the inflatable device 64 shown in FIG. 4 and is constructed in the same manner. More particularly, it includes an axially extending support tubing 94a, a head 94b at the lower end, an expansible and contractable sleeve 94c engaged with the lower end 94b, and an upper head 94d. A pressure fluid conduit 94e is engaged with a connector 94f above the upper head 94d. While the inflatable device is shown in FIG. 6 as having several diameters, it is constructed and arranged to include a reinforcing sheath in the tubular sleeve 94c which is uniform in diameter as described previously with respect to other embodiments. The tubular sleeve 94c also includes inner and outer resilient sleeves which serve the previously described functions.

The variations in diameter shown in FIG. 6 indicate the resiliency of the tubular sleeve 94c and are not permanently formed in the inflatable device 94.

In operation, positioning of a liner 90 in the well string 96 is achieved by first partially inflating the inflatable device 94 within the seal member 92 when the apparatus is at the earth's surface to provide means releasably securing the tubular member to the device 94. Inflation of the inflatable device 94 engages the device with the seal member 92 (in the unexpanded condition) and the weight of the liner 90 and the lower seal 91 is carried by the inflatable device 94 as the inflatable device and liner are positioned in the hole. When the liner 90 is positioned adjacent the formation 88, the inflatable device 94 is fully inflated to expand the seal member 92 which stretches the seal member 92 beyond its yield strength whereby the final configuration of the seal member 92 is achieved. Expansion beyond yield strength conforms the seal member 92 with the constraining well string, and the multi-diametered seal member shown in sectional view in FIG. 6 results in formation of the lands 92b and 92c. Also, expansion of the inflatable device 94 contacts the slips 92f against the casing 86 and engages the slips therewith to support the weight of the liner 90. A fluid seal is provided by the resilient material 92e to isolate the formation 88 from pressure fluids in the well string 86.

The inflatable device is thereafter fully deflated to clear the seal member 92 and is lowered on the pressure fluid conduit 94e to register with the lower seal member 91. The inflatable device 94 is fully inflated to expand the lower seal member 91 which engages the well string 86 to form a pressure fluid seal at the lower end of the liner 90. The inflatable device 94 is then deflated and the pressure fluid conduit 94e is retrieved from the well whereupon the liner 90 is permanently installed. As will be recognized by those skilled in the art, installation of the liner 90 seals the formation 88 against the flow of well fluids either from the well into the formation 88 or in reverse direction through the perforations 88a.

FIG. 7 of the drawing illustrates a pipe 96 of indefinite length and a tubular member 97 after expansion by an inflatable device 98. While the tubular member 97 is shown coterminous with the pipe 96, it may be appreciated that either may have greater length than the other. A portion of the inflatable device 98 is broken away to illustrate that the device includes the previously described segmented reinforcing sheath and preferably includes inner and outer resilient members cooperating therewith. Expansion of the member 97 may be achieved by inflating the device 98 at selected positions until the entirety of the length is expanded to the desired diameter. As will be recognized, the pipe 96 which surrounds the present invention as shown in FIG. 7 has any desired length and may be, by way of example and not limitation, a portion of pipeline, or the like.

Attention is directed to the enlarged view of FIG. 7A. The view shows the surrounding pipe 96 engaged by and intimately contacted by a resilient material carried on the tubular member 97 which, on expansion, seals the tubular member 97 to the pipe 96.

The inflatable device is provided by the present invention, such as the device 14 shown in FIG. 1 or the device 64 shown in FIG. 4, and includes a reinforcing sheath preferably made of individual wires which are woven together to form strips having a known width and any length required for the present invention. With respect to length, reference is made to the device shown in FIG. 2 which is relatively short in comparison with the device shown in FIG. 7.

Various alterations may be included in the present invention. For instance, the tubular member provided in the various embodiments for expansion by the inflatable element is connected thereto by partially inflating the inflatable element when running the device in the well bore and prior to registration at the desired depth. It is possible to provide retainer means on the inflatable element comprising suitable lateral projection means which extend radially outwardly to engage the tubular liner while the device is being run into a well bore. The projection means is preferably smaller than the tubular member or liner so that it will clear the expanded liner after installation.

The materials may vary from that previously suggested. For instance, the resilient coverings on the tubular liners may have the form of a resilient material bonded thereto, and the material may include particles of very hard material such as carbide or metal imbedded in the outer surface of the resilient material. Such particles, when suitably dispersed about the full surface area of the resilient tubing materials, provide a very tenacious grip with the surrounding pipe or well string. The particles however, should be suitably dispersed on the surface to not inhibit proper sealing between the resilient material and the surface of the casing or open bore.

The resilient material may be in the form of a suitable plastic applied to the tubular member as a coating or as layers of tape about the member. For instance, a tape of yieldable material wrapped around the liner which sets after the liner has been lowered into position can be used. Also, it is possible to use plastic material which is permanently set. Alternatively, it is possible to apply tape at a plurality of annular rings spaced longitudinally along the liner or tubular member, which rings will take a "bite" in the structure constraining the elongated tubular member on expansion.

The inflatable device of this invention is capable of expanding material such as stainless steel of 1/8" thickness or more. Materials chosen for the tubular liner may include impregnated Fiberglas wraps, aluminum (yield strength of about 10,000 pounds per square inch) or various steels (yield strength as high as 50,000 pounds per square inch). In addition, the tubular member may include bondable materials which set up against the internal wall of the bore hole or pipe constraining the expanded tubular member. Thus, the resilient material on the exterior may be a continuation of the bonding material impregnated in a fibrous wrap made of Fiberglas or the like.

Broadly, this invention relates to an apparatus and method for expanding tubular members to conform with the internal shape of molds, pipe, and bore holes (whether open, cemented, or cased) for positioning tubular members therein.

I claim:

1. An arrangement to be run into a bore hole or other opening for expansion of a non-corrugated, metal tubular liner or patch therein, comprising:
   (a) a mandrel adapted to be run into a bore hole or other opening;
   (b) an inflatable member joined to said mandrel for inflation on admission of pressure fluid;
   (c) an expandable reinforcing sheath overlaid on said inflatable member for expansion therewith;
   (d) means for admitting pressure fluid to said inflatable member to inflate and expand same and said reinforcing sheath therewith;
   (e) a non-corrugated, metal tubular member positioned about said reinforcing sheath and said inflatable member for expansion and stretching beyond its elastic limit by said sheath and inflatable member when they are inflated; and
   (f) sealing means on the exterior surface of said non-corrugated, metal tubular member for sealing said tubular member with the wall of the well bore or other opening upon stretching of said non-corrugated, metal tubular member beyond its elastic limit.

2. An arrangement to be run into a bore hole or other opening for expanding a non-corrugated, metal tubular member or patch therein, comprising:
   (a) a mandrel adapted to be run into a well bore or other opening;
   (b) an inflatable member joined to said mandrel for inflation on admission of pressure fluid;
   (c) a segmented, expandable reinforcing sheath overlaid on said inflatable member for expansion therewith;
   (d) an outer liner enclosing said reinforcing sheath;
   (e) means for admitting pressure fluid to said inflatable member to inflate same and expand said reinforcing sheath and said outer liner therewith;
   (f) a non-corrugated, metal tubular member positioned about said outer liner for expansion and stretching beyond its elastic limit by said reinforcing sheath and said outer liner upon inflation of said inflatable member; and
   (g) sealing means on the exterior surface of said non-corrugated, metal tubular member for sealing said tubular member against the wall of the well bore or other opening upon stretching said tubular member beyond its elastic limit.

3. An arrangement to be run into a borehole or other opening for expanding a non-corrugated, metal tubular member or patch therein, comprising:
   (a) a mandrel adapted to be run into a well bore or other opening;
   (b) an inflatable member joined to said mandrel for inflation on admission of pressure fluid;
   (c) a segmented, expandable reinforcing sheath overlaid on said inflatable member for expansion therewith;
   (d) means for admitting pressure fluid to said inflatable member to inflate same and expand said reinforcing sheath therewith;
   (e) a non-corrugated, metal tubular member having an open lower end positioned about said reinforcing sheath for expansion and stretching beyond its elastic limit by said reinforcing sheath and inflatable member upon inflation of said inflatable member;
   (f) protector means carried by said mandrel below the lower open end of said tubular member for preventing damage to said tubular member when running same into a well bore or other opening; and
   (g) sealing means on the exterior surface of said non-corrugated, metal tubular member for sealing said tubular member with the wall of the well bore or other opening upon expansion of said inflatable member.

4. An arrangement for anchoring a liner in a well bore, with or without casing, comprising:
   (a) a mandrel adapted to be run into a well bore;
   (b) an inflatable member joined to said mandrel for inflation on admission of pressured fluid;
   (c) an expandable reinforcing sheath overlaid on said inflatable member for expansion therewith;
   (d) a liner;
   (e) a coaxially extending anchor member connected to said liner and extending about said reinforcing sheath;
   (f) said anchor member being fabricated of a material of sufficient thickness and having a high yield strength so that high stresses are required to deform same past yield strength; and
   (g) frictional engaging means on the exterior of said anchor for contacting and engaging the wall of the well bore to anchor said liner therein.

5. An arrangement for anchoring and sealing a liner in a well bore, comprising:
   (a) a mandrel adapted to be run into a well bore;
   (b) an inflatable member joined to said mandrel for inflation on admission of pressure fluid;
   (c) an expandable reinforcing sheath overlaid on said inflatable member for expansion therewith;
   (d) a liner;
   (e) an anchor member secured to one end of said liner;
   (f) an anchor member secured to the other end of said liner;
   (g) wall engaging means on the exterior of said anchor members for sealing with the wall of the well bore on engagement therewith;
   (h) said anchor members being fabrciated of a material of sufficient thickness and having a high yield strength so that expansion thereof engages said wall engaging means with the wall of the well bore to support said liner in position; and (i) said anchor members receiving said inflatable member and said overlaid reinforcing sheath therein for expansion of said anchor members on admission of pressure fluid to said inflatable member.

References Cited

UNITED STATES PATENTS

| | | | |
|---|---|---|---|
| 2,214,226 | 9/1940 | English | 166—207 |
| 2,214,227 | 9/1940 | English | 166—48 |
| 2,734,580 | 2/1956 | Layne | 166—14 |
| 2,778,432 | 1/1957 | Allen | 166—187 |
| 3,134,442 | 5/1964 | Jennings | 166—207 |
| 3,326,293 | 6/1967 | Skipper | 166—150 |
| 3,364,993 | 1/1968 | Skipper | 166—4 |

JAMES A. LEPPINK, Primary Examiner

U.S. Cl. X.R.

166—187, 208, 277